July 31, 1934.  A. G. ENOCK  1,968,751
PASTEURIZATION OF MILK AND OTHER LIQUIDS
Filed Oct. 14, 1931  4 Sheets-Sheet 1

INVENTOR

July 31, 1934.   A. G. ENOCK   1,968,751
PASTEURIZATION OF MILK AND OTHER LIQUIDS
Filed Oct. 14, 1931   4 Sheets-Sheet 2
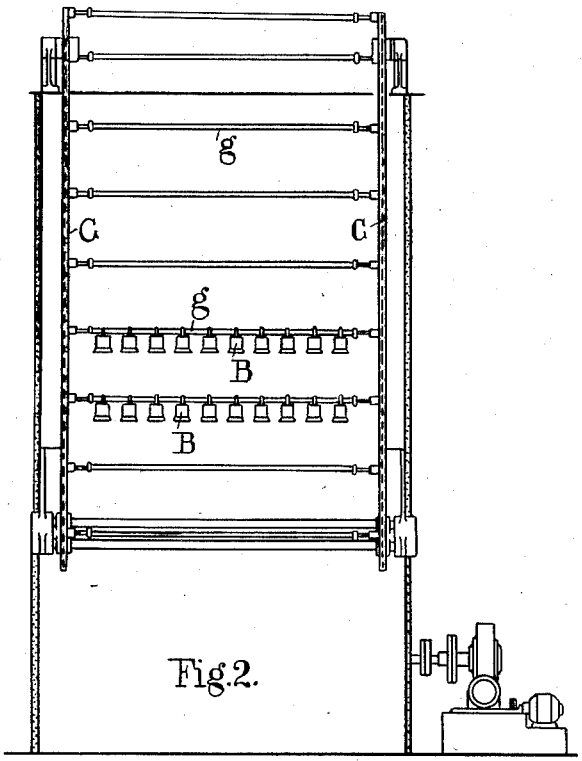
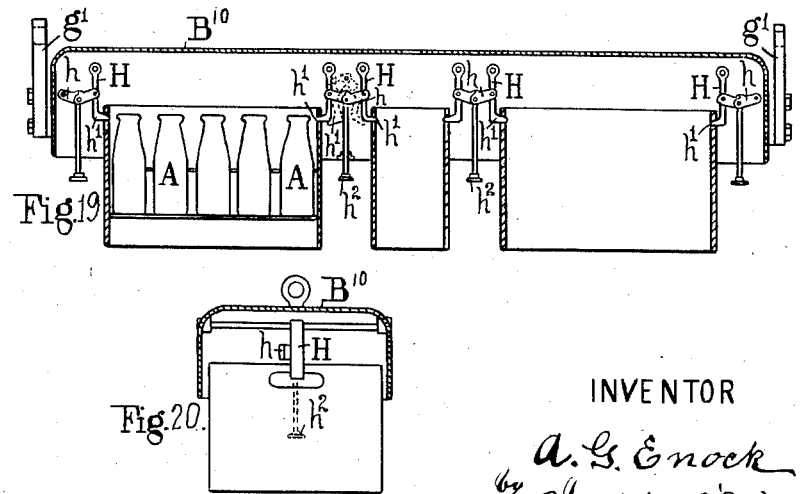
INVENTOR
A. G. Enock
by Jowden O'Brien
Atty.

July 31, 1934.  A. G. ENOCK  1,968,751
PASTEURIZATION OF MILK AND OTHER LIQUIDS
Filed Oct. 14, 1931  4 Sheets-Sheet 3
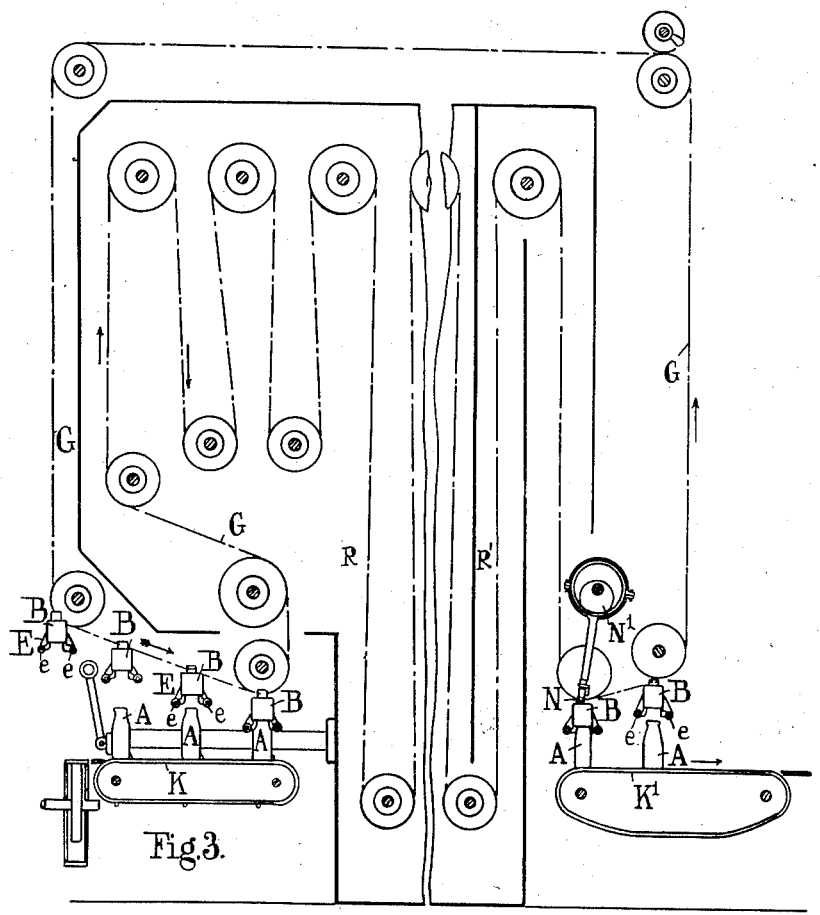
Fig.3.
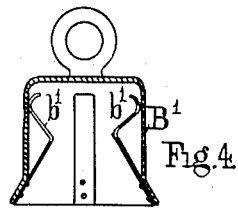
Fig.4.
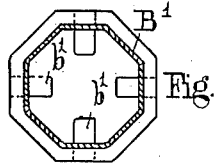
Fig.5.
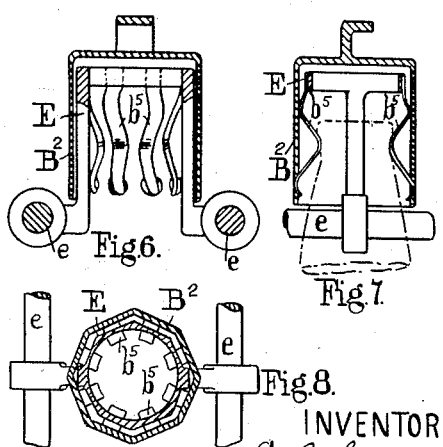
Fig.6.
Fig.7.
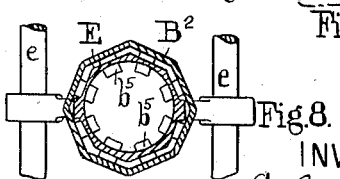
Fig.8.
INVENTOR
A. G. Enock July 31, 1934.  A. G. ENOCK  1,968,751
PASTEURIZATION OF MILK AND OTHER LIQUIDS
Filed Oct. 14, 1931  4 Sheets-Sheet 4
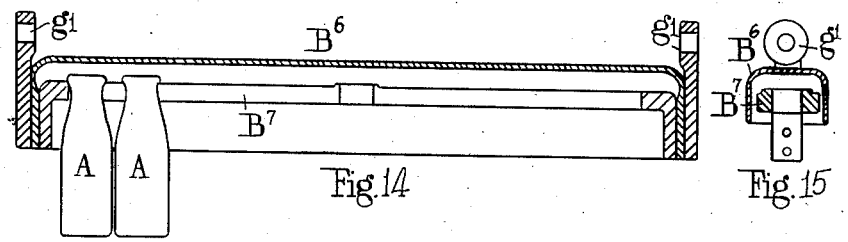
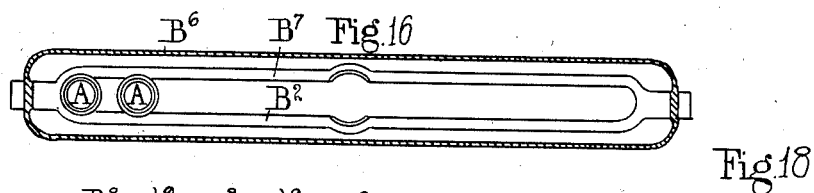
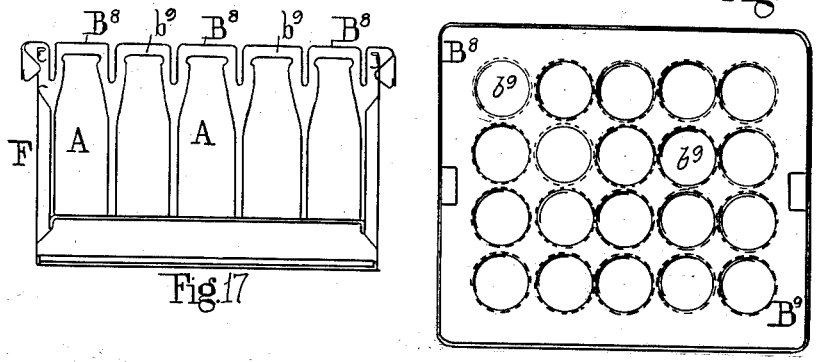
INVENTOR
A. G. Enock.

Patented July 31, 1934

1,968,751

UNITED STATES PATENT OFFICE 1,968,751

PASTEURIZATION OF MILK AND OTHER LIQUIDS

Arthur Guy Enock, Wembley Park, England, assignor to Auto Dairy Pioneers Limited, London, England Application October 14, 1931, Serial No. 568,836
In Great Britain November 4, 1930

4 Claims. (Cl. 126—272)

This invention relates to the pasteurization and cooling of milk and other liquids in bottles or containers which are closed by a disc or lightly attached cap around which air can slowly percolate.

It is found that in pasteurizing the best results are obtained by gradually or slowly cooling the milk and such gradual cooling has the added advantage in disc closed or lightly capped bottles that the space or partial vacuum formed by the contraction of the contents of the bottle is very gradually filled up with air which slowly leaks past the disc or cap without displacing or disturbing such disc or cap.

Pasteurizing in this type of bottle has been carried out successfully in apparatus in which the bottle is not wholly submerged in the heating or cooling liquid but the mouth is maintained above the level of the liquid through which it passes.

In other known types of apparatus in which the bottles or containers are traversed either vertically or horizontally submerged through liquid cooling medium it has been proposed to carry the bottles in cages or carriers attached to endless conveyor chains each cage being fitted with a cap or sealing member shaped to conform to the neck of the bottle and the disc therein forming a liquid tight and air tight seal.

An air tight seal over the mouth of the bottle during cooling of the contents results in a partial vacuum under the disc and when the seal is removed and the disc exposed to air pressure it is liable to become displaced or bulged inwards becoming too loose to serve as an efficient cover or protector.

The object of the invention is to provide means for gradually admitting air past the disc while the bottle is wholly submerged in a heating or cooling liquid and at the same time protecting the disc from contact with the liquid.

According to the invention the disc or cap and preferably also the mouth of the bottle are enclosed by an air bell or chamber from which air imprisoned therein during the pasteurization can slowly leak past the disc or cap into the bottle while the bottle is wholly submerged in the heating or cooling liquid.

The invention further comprises air bells or covers for enclosing the bottle mouths and suspending the bottles from endless chain conveyors, and apparatus for automatically placing the bottles in and delivering the bottles from the air bells.

The invention will be fully described with reference to the accompanying drawings:—

Fig. 2 is a front elevation being the feeding and delivering end of same.

Fig. 3 is a longitudinal sectional elevation of a modified plant showing the invention and apparatus for feeding the bottles thereto and discharging them therefrom.

Figs. 4 and 5 are sectional elevation and plan from below of an air bell or bottle carrier such as shown in Figs. 1 and 2.

Figs. 6, 7 and 8 are sectional elevations and sectional plan of a bottle carrier and air bell such as shown in Fig. 3.

Figs. 14, 15 and 16 are sectional elevations and a plan of an air bell for suspending and carrying a number of bottles.

Figs. 17 and 18 are sectional elevation and plan of air bell applied to a crate of bottles.

Figs. 19 and 20 are sectional elevations showing air bell for suspending and carrying a group of crates containing bottles.

Figure 1:
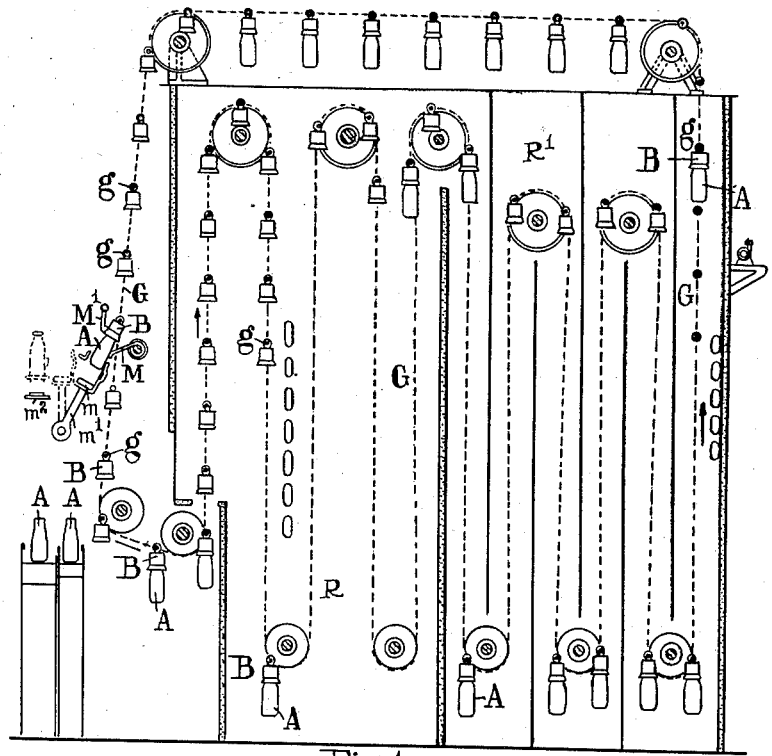
Fig. 1 is a longitudinal sectional elevation of single bottle pasteurizing and cooling plant showing the invention applied thereto.

The mouth of a bottle A is covered by a bell B of sufficient size to contain and imprison air in a chamber $b$ above and around the sealing disc $a$ or is covered by a cap D held against the bottle mouth, an air chamber $d$ extending above the sealing disc $a$ and admitting air freely to the edges of the disc. The bell B or cap D may be applied individually to single bottles A contained in crates or otherwise carried in groups or they may be suspended from endless conveyor chains G as shown in Figs. 1 to 3 and act as carriers for the bottles suspended therefrom.

In the form shown in Figs. 4 and 5 the bell B' is of cylindrical or polygonal form of a length that will extend down over the shoulder of the bottle A and preferably flaring around the edge. It is fitted internally with three, four or more spring clips $b^1$ adapted to clip around the neck of the bottle A when inserted therein with sufficient tightness to hold the bottle suspended.

In the form shown in Figs. 6, 7 and 8 the bell B² is of cylindrical form of a length that will extend down over the shoulder of the bottle A. A bottle carrier E is loosely fitted within the bell B² fitted internally with three, four or more spring clips $b^5$ adapted to clip around the neck of the bottle A with sufficient tightness to hold the bottle suspended. The spring clips $b^5$ while they grip the bottle A as shown also retain the bell $B^2$ in position over the bottle mouth. By raising the bell $B^2$ relative to the carrier by a jerk or otherwise above the end of the spring clips $b^5$ the springs expand and release the bottle allowing it to drop out. The carriers E are mounted on transverse rods $e$ carried by endless conveyor chains G as shown in Fig. 3.

Figure 9:
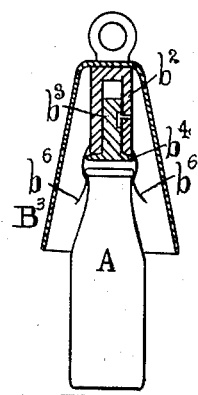

In the form shown in Fig. 9 the bell $B^3$ is of cylindrical or conical form of a length that will extend down over the shoulder of the bottle A. It is fitted internally with three, four or more spring clips $b^6$ attached to a centrally downwardly projecting member $b^2$ adapted to clip around the neck of the bottle A when inserted therein with sufficient tightness to hold the bottle suspended.

The member $b^2$ also carries a plunger $b^3$ with a disc $b^4$ disposed between the springs, when the bottle is in the pendant position the disc $b^4$ is slightly above the bottle mouth. The bottle is released by pushing it and the plunger $b^3$ and disc $b^4$ upwards to the full extent which movement causes the disc $b^4$ to spread the spring clips $b^6$ and release the bottle, the plunger $b^3$ being made a tight fit in the member $b^2$, the disc $b^4$ only returns slowly to its place after the bottle has been removed.

Figure 10:
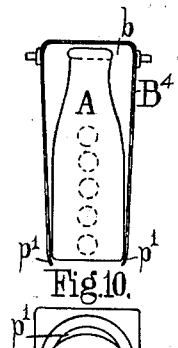
Figure 11:
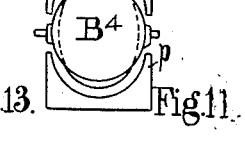

In the form shown in Figs. 10 and 11 the bell $B^4$ is of slightly tapering form and of a length to extend to the bottom of the bottle. The sides below the air chamber $b$ are flexible and the cross section at the lower part is oval so that when it is squeezed to a round shape by the plates $p$, the bottle may be put in the bell and when pressure from plates $p$ is removed the bell resumes its oval shape and the lower edge $p^1$ holds the bottle in place.

Figure 12:
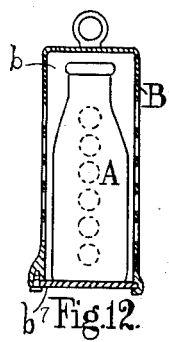
Figs. 9 to 13 show various forms of air bells for suspending and carrying the bottles.
Figure 13:
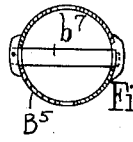

In the form shown in Figs. 12 and 13 the bell $B^5$ is of cylindrical form of a length that will extend to the bottom of the bottle. It is fitted at the bottom with a transverse bar or plate $b^7$ which may be hinged or pivoted to hold the bottle in place. The sides of the bell B may be perforated below the air chamber $b$.

In the form shown in Figs. 14, 15 and 16 a bell $B^6$ similar in principle to that previously described is fitted over a rack or pair of grid bars $B^7$ to cover or enclose a number of bottles. The bottles A are suspended by their necks between the two bars of the rack and the bell and rack are pivoted by their ends by a transverse bar $g$ or link pins between two endless conveyor chains G'. The bars may be indented to locate the bottles at definite distances apart.

In the form shown in Figs. 17 and 18 the invention is shown applied to a crate of bottles. A cover $B^8$ of a size to fit over and attach to the crate F is formed with a number of bells $B^9$ one for each bottle which extend down to the shoulder of the bottle each having an air chamber $b^9$.

In the form shown in Figs. 19 and 20 the invention is shown as applied to and forming a carrier for a group of crates containing bottles. The bell $B^{10}$ is of a size and shape to cover three (or other number of) crates and to extend down below the shoulders of the bottles therein. It is fitted with crate suspending appliances H operated by toggle levers $h$. When the bell is placed over the crate the toggle levers $h$ are in the dotted inclined position and the catches $h^1$ are moved into engagement with the hand holes or other apertures in the sides of the crates by a downward movement of the rods $h^2$ acting on the toggles $h$. The bells $B^{10}$ are suspended from the conveyor chains G by the side cheeks $g^1$.

Referring again to Figs. 1 to 13 and Figs. 14 to 20 when the bottles are wholly submerged in liquid while in an upright position the air enclosed in the air chamber $b$ within the bell B is compressed and prevents the liquid reaching or coming into contact with the bottle mouth or with the sealing disc $a$ therein. The bottles are suspended on the endless conveyor G and passed through a heating chamber R and then through the cooling chamber $R^1$ as shown in Figs. 1 or 3. As the cooling of the milk or liquid in the bottle A gradually takes place and the contents contract forming a partial vacuum in the bottle neck the air in the chamber $b$ is slowly drawn in around the edges of the disc $a$ without displacing or distorting the disc.

A further advantage arises in that air admitted to the bottle from the air chamber in the bell or cover has been sterilized whilst submerged in the heating liquid during the process and no germ laden air is admitted to the bottle.

Referring again to Figs. 1, 2 and 3 the bells B are shown suspended from endless conveyor chains G by transverse rods $g$ upon which any number of the bells B may be pivoted according to the width of the machine. The bottles A may be fed into the bells B singly by hand as in Fig. 1 or they may be fed in automatically as in Fig. 3 the bottles being fed forward on a conveyor K and the bells B descending over their mouths. The bottles A may be removed from the bells B singly by hand or they may be removed automatically as in Fig. 1 by a rocking bar M which tilts the bottles to one side and a second rocking bar $M^1$ which tilts the bell B back in the reverse direction thus dislodging the bottle. The bottle B so released slides down on to a carrier or pad $m$ on an oscillating rod $m^1$ which swings forward and pushes it on to the delivery conveyor $m^2$.

In Fig. 3 the types of bell B shown in Figs. 6, 7 and 8 are shown the carriers E being supported by the transverse rods $e$. The bottles are fed into the carriers and the bells B automatically by the conveyor K and the carriers descending over their mouths. The carriers E and bells B are pressed down upon the bottles A until they are held by the internal spring clips $b^1$. At the delivery end the bottles as they emerge are suspended clear of the conveyor $K^1$ and the bell B is jerked or slightly raised by hook N operated by a cam or eccentric $N^1$ which engages a hook or projection on the top of the bell. This action enables the spring clips to spread apart and releases the bottle which drops upon the conveyor $K^1$.

As each bell and carrier comes round to the feed end of the machine the bell B is pressed down to its original position on the carrier E leaving the spring clips $b^1$ in position to pick up another bottle.

The covers D may be suspended from the conveyor chains G in a similar manner and the bottles fed in and discharged by hand or automatically.

What I claim as my invention and desire to protect by Letters Patent is:—

1. Apparatus for pasteurizing milk and other liquids in bottles comprising heating and cooling chambers through which the bottles are traversed, an endless chain conveyor traversing the chambers, a plurality of bell shaped covers each provided with an air chamber to enclose a bottle mouth and imprison air during immersion and a plurality of transverse bars carried by the conveyer chains upon which the bell covers are mounted.

2. Apparatus for pasteurizing milk and other liquids in bottles comprising heating and cooling chambers through which the bottles are traversed, an endless chain conveyor traversing the chambers, a plurality of bell shaped covers each provided with an air chamber to enclose a bottle mouth and imprison air during immersion, a plurality of transverse bars carried by the conveyer chains upon which the bell covers are mounted, means to engage the bottles with, and means to remove them from, the bell shaped covers.

3. Apparatus for pasteurizing milk or other liquids in bottles comprising heating and cooling chambers through which the bottles are traversed, an endless chain conveyor traversing the chambers, a plurality of bell shaped covers each provided with an air chamber to enclose the bottle mouths, spring clips by which the bottles are attached to the bell shaped covers, a plurality of transverse bars carried by the conveyer chains, and means for attaching the bell shaped covers to the transverse bars.

4. Apparatus for pasteurizing milk or other liquids in bottles comprising heating and cooling chambers through which the bottles are traversed, an endless chain conveyor traversing the chambers, a plurality of bell shaped covers each provided with an air chamber to enclose the bottle mouths, spring clips by which the bottles are attached to the bell shaped covers, a plurality of transverse bars carried by the conveyer chains, means for attaching the bell shaped covers to the transverse bars, a second conveyor to bring the bottles to the chain conveyor at the feed end of the apparatus, cam operated mechanism at the delivery end of the apparatus to release the bell shaped covers from the bottles and a delivery conveyor to remove the bottles from the apparatus.

ARTHUR GUY ENOCK.